Oct. 27, 1942.  T. R. BROWN  2,300,198
PEAK VELOCITY INDICATOR
Filed June 10, 1942

Inventor:
Theodore R. Brown,
by Harry E. Dunham
His Attorney.

Patented Oct. 27, 1942

2,300,198

UNITED STATES PATENT OFFICE 2,300,198

PEAK VELOCITY INDICATOR

Theodore R. Brown, Schenectady, N. Y., assignor to General Electric Company, a corporation of New York Application June 10, 1942, Serial No. 446,478

2 Claims. (Cl. 171—95)

My invention relates to measuring devices and concerns particularly arrangements for indicating or obtaining a response to peak values of electrical quantities, or quantities which can be converted into electrical quantities.

It is an object of my invention to provide an improved arrangement for measuring the maximum velocity of moving objects or apparatus subjected to jarring and shock.

A further object of my invention is to provide an arrangement for measuring peak values of minute voltages, which combines the advantages of reliability and the ability to give a sustained indication, utilizing apparatus which is sturdy, holds its adjustment well and may easily be operated by unskilled or inexperienced operators.

Still another object of my invention is to provide an arrangement for compensating a diode tube while operating with small bias.

Other and further objects will become apparent as the description proceeds.

In carrying out my invention in its preferred form I provide a pick-up coil adapted to cooperate with a permanent magnet which is moved in response to the motion of tested apparatus, the maximum velocity of which is to be determined.

The pick-up coil is connected to a condenser with a suitable rectifying device such as a diode tube for the purpose of applying a charge to the condenser which is proportional to the voltage impulse produced by the passage of the magnet through the pick-up coil and therefore proportional to the peak velocity of the magnet. A vacuum tube circuit is utilized for measuring the voltage built up between the plates of the condenser by the charge placed thereon. A compensating leakage resistor is included in the vacuum tube circuit for bleeding the leakage current of the diode tube to prevent a building up of a charge on the condenser and producing a false indication when no voltage is induced in the pick-up coil. Preferably a small bias is applied in the circuit of the diode tube.

A better understanding of the invention will be afforded by the following detailed description considered in connection with the accompanying drawing, and those features of the invention which are believed to be novel and patentable will be pointed out in the claims appended hereto.

Figure 1:
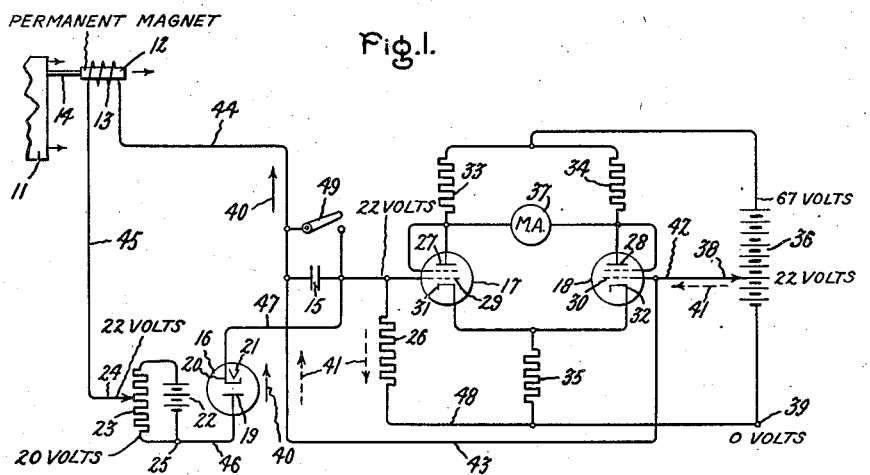
Figure 2:
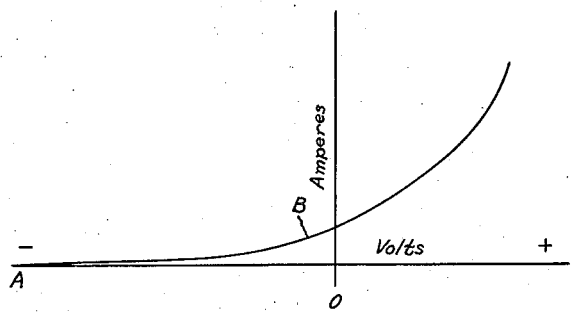

In the drawing Fig. 1 is a circuit diagram of one embodiment of my invention, and Fig. 2 is a graph explanatory of the principle of operation.

For measuring the peak velocity of an object 11 which is vibrated or jarred by a means (not shown), an electromagnetic arrangement may be utilized comprising a permanent magnet 12, a current-conducting coil 13 through which the magnet 12 is adapted to move, and an apparatus to be described more in detail hereinafter for measuring the peak value of voltage induced in the coil 13 by passage of the magnet 12 through it. For causing the magnet 12 to follow the movement of the object 11 it may be supported by a member which is in contact with the object 11, or a suitable mechanical linkage may be provided such as a rod 14 which is in contact with the object 11 and the magnet 12, and which causes the magnet 12 to be propelled through the coil 13 at the peak velocity in a given direction such as the right-hand direction of the object 11. The structural features of the arrangement for causing the magnet 12 to follow the motion of the object 11 are not a part of my invention and are therefore indicated only schematically.

For producing an indication of the peak value attained by the voltage induced by the passage of the magnet 12 through the coil 13, I provide a condenser 15 and a rectifying device 16 connecting the condenser 15 in series with the coil 13 for the purpose of causing the condenser 15 to collect a charge proportional to the peak value of the voltage induced in the coil 13 without allowing this charge to be dissipated again through the coil 13 when the induced voltage therein falls off. A non-loading voltmeter such as a vacuum tube voltmeter comprising a pair of triode tubes 17 and 18 is provided for measuring the voltage of the condenser 15 produced by the charge.

In order to prevent leakage of current through the rectifying device 16, a bias voltage may be provided. However, I have found that in the case of the most suitable type of rectifying devices such as diode vacuum tubes the characteristic curve is relatively flat near cut-off and a very large bias is required to diminish the leakage current sufficiently to prevent the gradual accumulation of a false charge by the condenser 15. Owing to the flatness of the characteristic curve of a diode tube in the region of minute leakage currents, if the diode is biased to cut-off, minute voltages such as those produced by the coil 13 have relatively little effect in varying the charging current of the condenser 15. Consequently, the use of large bias results in a very insensitive device.

The representative characteristic curve of two-element vacuum tubes or diodes is shown in Fig. 2 in which the current through the diode is measured along a vertical axis and the voltage required to produce such a current is measured along a horizontal axis. The voltage in question is that between the anode 19 and the cathode 20 of the diode 16, the cathode 20 being shown as of the indirectly heated type having a heater 21 energized by a current source (not shown).

It will be observed from the curve of Fig. 2 that although the leakage current becomes exceedingly small when relatively large voltage is applied between the anode 19 and the cathode 20, the leakage current does not actually fall to zero or reach the cut-off point A until the negative voltage or bias becomes rather large where the curve is quite flat. On the other hand, in the region of zero bias B the curve has greater slope, and greater sensitivity could be obtained if the apparatus were operated in this portion of the curve. Accordingly, I provide relatively small bias of the order of approximately two volts, for example, comprising a battery of cells 22 having a potentiometer resistor 23 connected across it with a movable tap 24 for bias adjustment. As shown the potentiometer 23, 24 is interposed in series with the coil 13 and the diode 16, the negative end 25 of the potentiometer being connected to the anode 19 of the diode 16. For compensation of the leakage current of the diode 16 a leakage resistor 26 is provided, the connections of which will be explained more in detail hereinafter.

The voltage measuring vacuum tubes 17 and 18 comprise anodes 27 and 28, control electrodes or grids 29 and 30, and cathodes 31 and 32, respectively. The anodes 27 and 28 are connected in series with resistors 33 and 34, respectively, and a common cathode resistor 35 is provided. The tubes 27 and 28 are energized by a current source shown as a battery of cells 36. A suitable instrument such as a milliammeter 37 is connected between the anodes 27 and 28 for indicating any unbalance in vacuum tube currents caused by the difference in grid potentials. For making the tubes responsive to any voltage difference between the plates of the condenser 15, the grids 29 and 30 are connected across the condenser 15. The grids 29 and 30 are held at a suitable negative potential with respect to the cathodes 31 and 32 to prevent the flow of grid currents and discharge of the condenser 15, by the use of the cathode bias resistor 35 and one of the grids, viz: the grid 30 is tied to an intermediate point 38 of the anode voltage source 36.

The diode leakage compensating resistor 26 is connected between the condenser plate at the grid 29 and the negative ends of the vacuum tube circuits represented by the negative terminal 39 of the battery 36. The resistance of the leakage resistor 26 and the potential of the tap 38 are so chosen in relation to the adjustment of the diode bias potentiometer 23, 24 that the leakage current through the resistor 26 equals the leakage current through the diode 19 at the bias provided by the potentiometer 23, 24. Consequently no charge builds up on the condenser 15 and the potential difference between the plates of the condenser 15 remains zero until a voltage impulse is impressed by the coil 13.

My invention is not limited to the use of any particular set of circuit constants. However, I have found that satisfactory results may be obtained, when using a diode tube having a leakage current of about $22 \times 10^{-9}$ amperes at about 2 volts negative bias, by utilizing a leakage resistor 26 having a resistance of 1000 megohms when the tap 38 is 22 volts above the negative terminal 39, and utilizing vacuum tubes 17 and 18 with 2000 ohm anode resistors 33 and 34, a 1000 ohm cathode resistor 35 and a battery 36 supplying about 67 volts, the condenser 15 having a capacity of .02 microfarad. For the purpose of making the time constant of the leakage circuit through the resistor 26 relatively large giving the operator ample time to read the instrument 37 after a voltage impulse has been produced by the coil 13, I prefer to make the resistance of the resistor 26 relatively large as indicated and arrange the circuit so that the potential of the tap 38 is also relatively large.

It will be observed that the portion of the battery 36 between the tap 38 and the negative terminal 39 causes a leakage current through the resistor 26 overcoming the leakage current of the diode 16 caused by its cathode emission by bleeding such current from the condenser 15. Considering only the circuit of the diode 16 and the condenser 15, the leakage current represented by the solid arrows 40 would tend to flow charging the condenser 15 until the voltage accumulated by the condenser 15 had augmented the negative bias of the bias potentiometer 23, 24 sufficiently to reduce the leakage current of the diode 16 to zero. Considering only the circuit of the portion of the battery 36 between the taps 38 and 39 supplying the condenser 15 and the resistor 26, it will be seen that a discharging or bleeding current would tend to flow from the condenser 15 represented by the dotted line arrows 41.

The circuit is so adjusted as to make this bleeding current equal to the leakage current of the diode 16 at the desired operating point. Consequently the charge of the condenser 15 remains at zero. Looked at another way the portion of the battery 36 between the taps 38 and 39 causes current to flow through a circuit from the point 38, through conductors 42, 43 and 44, coil 13, conductor 45 to the tap 24 through the lower portion of the resistor 23, through the conductor 46, the diode 16, the conductor 47, the resistor 26, and the conductor 48 back to the negative terminal 39 of the battery 36. With the assumed values of circuit constants and characteristics of the diode 16, it will be observed that the potential difference between the battery terminals 38 and 39 is 22 volts. The potential difference or resistance current drop through the resistor 26 is also 22 volts. The potential drop through the negligible circuit resistances and the potentiometer 23, 24 is 2 volts. The potential rise through the diode 16 is also 2 volts so that there is no potential difference between the plates of the condenser 15. To obtain this condition it will of course be necessary to have the proper adjustment of the circuit constants. To allow for differences in characteristics of the different diodes or for temperature variations, provision for a circuit adjustment should be made by making one of the following elements adjustable, viz: the resistance of the resistor 26, the location of the tap 38, or the magnitude of the bias supplied by the potentiometer 23, 24. Ordinarily the adjustable tap 24 of the potentiometer 23 will provide sufficient adjustment to bring the potential difference between the plates of the condenser 15 to zero. It will be understood that sufficient time will ordinarily elapse between readings to discharge the condenser 15. However, if desired a discharge switch 49 may be provided for momentarily short-circuiting the condenser 15 after each reading has been completed.

When a reading of peak velocity is made a voltage will be induced in the coil 13 which charges the condenser 15 through the diode 16 up to the peak value of the induced voltage raising the potential of the vacuum tube grid 29. This increases the discharge current through the tube 17 and through the cathode resistor 35 increasing the cathode bias of the tube 18 and decreasing its discharge current. Accordingly a differential current flows through the milliammeter 37 depending upon the potential difference between the grids 29 and 30 determined by the magnitude of the peak voltage induced in the coil 13 and the peak velocity of the coil 13 giving rise to the induced voltage. Thus the instrument 37 indicates peak velocity.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A peak voltage indicator comprising a condenser, a discharge tube type of rectifying element and a source of negative bias voltage in series with connections for applying a voltage the peak value of which is to be measured, a voltmeter connected across the condenser for measuring the voltage of the charge accumulated thereon by the application of the peak voltage to be measured through the rectifying element, and a circuit for compensating leakage current of the rectifying element comprising a resistor having relatively high resistance and a voltage source having relatively high potential difference connected in series across the condenser, the values of said last-mentioned potential difference and resistance being selected to produce a bleeding current equaling the leakage current of the rectifying element.

2. A peak voltage measuring system comprising a condenser, a voltage source the peak value of which is to be measured, a rectifying element connected in series, a voltage measuring device connected across the condenser and a circuit for compensating leakage current of the rectifying element comprising a source of voltage and a resistor connected in series across the condenser, the voltage source having such polarity as to produce a current flow through the condenser in the opposite direction from the leakage current through the rectifying element, the magnitudes of the voltage source and said resistance being chosen to produce a discharge current equaling the leakage current of the rectifying element.

THEODORE R. BROWN.